(12) United States Patent
Piovaccari et al.

(10) Patent No.: US 6,229,289 B1
(45) Date of Patent: May 8, 2001

(54) POWER CONVERTER MODE TRANSITIONING METHOD AND APPARATUS

(75) Inventors: Alessandro Piovaccari, Columbia; Carl A. Ramsey, Marriottsville; Eric H. Naviasky, Ellicott City, all of MD (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/513,339

(22) Filed: Feb. 25, 2000

(51) Int. Cl.[7] ........................................................ G05F 1/40
(52) U.S. Cl. ............................ 323/268; 323/273; 323/282
(58) Field of Search ...................... 323/268, 269, 323/270, 271, 272, 273, 282, 284

(56) References Cited

U.S. PATENT DOCUMENTS

| | | | |
|---|---|---|---|
| 5,541,499 | * 7/1996 | Villard | 323/268 |
| 5,592,072 | * 1/1997 | Brown | 323/268 |
| 5,945,820 | 8/1999 | Namgoong et al. | 323/282 |
| 5,959,443 | 9/1999 | Littlefield | 323/287 |
| 5,994,885 | 11/1999 | Wilcox et al. | 323/285 |
| 5,998,977 | * 12/1999 | Hsu et al. | 323/272 |

OTHER PUBLICATIONS

Vishay Siliconix, New Product Description, Si9167, 600–mA Synchronous Buck Converter for 2–Cell Li+ Cellular Phones, Document No. 70898, S–63920, Rev. C, Aug. 23, 1999.

Maxim Integrated Products, Product Description, MAX1677, Compact, High–Efficiency, Dual–Output Step–Up and LCD Bias DC–DC Converter, 19–1403; Rev 0; 11/98.

Maxim Integrated Products, Product Description, MAX1692, Low–Noise, 5.5V–Input, PWM Step–Down Regulator, 19–1400; Rev 0; 11/98.

Maxim Integrated Products, Product Description, MAX748A/MAX763A, 3.3V, Step–Down, Current–Mode PWM DC–DC Converters, 19–0190; Rev 0; 9/93.

Impala Linear Corporation, Product Description, ILC6390/1, SOT–89 Step–Up PFM Switcher with Auto–Load Sense, Jun. 1996.

Dixon, Lloyd H., Jr., "Switching Power Supply Topology Review", Unitrode Power Supply Design Manual, published by Unitrode Corporation, Lexington, Massachusetts, 1985.

Linear Technology Corporation, "Design Notes—A Simple Ultra–Low Dropout Regulator", No. 32 in a series, Mar. 1990.

* cited by examiner

*Primary Examiner*—Jessica Han
(74) *Attorney, Agent, or Firm*—Lyon & Lyon LLP

(57) ABSTRACT

A method and apparatus are provided for transitioning a power converter between a switched mode of operation and a linear regulator mode of operation. The power converter operates according to one or more intermediate modes of operation in which the switched mode and linear regulator modes cooperate to produce a shared power converter output. The power converter transitions between the various modes of operation in response to changes in circuit parametric conditions as defined by a series of state transition diagrams. Power converter output voltage is maintained in regulation during all modes of operation and transitions therebetween. The method and apparatus includes an integrated device that may be operated as a switch or a variable resistance device.

13 Claims, 11 Drawing Sheets

POWER CONVERTER MODE TRANSITIONING METHOD AND APPARATUS

SUMMARY OF THE INVENTION

The present invention provides a method and apparatus for transitioning a power converter between a switched mode of operation and a linear regulator mode of operation in a single power converter. An intermediate mode of operation and associated circuitry is provided that allows the switched mode and linear regulator mode to cooperate to produce a shared power converter output having reduced noise and voltage ripple as compared to a converter that is alternating between switched mode and fully-on modes of operation.

DETAILED DESCRIPTION OF THE PREFERRED EMBODIMENTS

Independent of battery technology and construction, operating environment and other such factors, the power requirements of a portable electronic device determine the useful battery life. Thus, the power requirements of the circuitry comprising a given portable electronic device form a critical engineering design parameter. Advances in the state of the art have resulted in the availability of components capable of operating at increasingly lower voltage and current specifications, but these components require correspondingly tighter tolerances.

While allowed to vary within specified tolerances, the voltage requirements of the circuitry of a portable electronic device remain constant over time. This circuit input voltage must remain within the specified tolerances in order for the device circuitry to function reliably. In contrast, the voltage available from the power source, such as a battery, varies over time due to a variety of factors including dissipation over time of the charge maintained by the battery (discharge of the battery causes supply voltage to drop), temperature and other external environmental conditions, and contact corrosion.

In order to provide a constant supply of voltage to the device circuitry within the specified required tolerances, a power converter device is typically used. The power converter takes the power source voltage as an input and converts it to and maintains it at the desired output voltage signal. The power converter further typically includes circuitry to regulate the power converter output within the specified device circuitry input voltage tolerances for wide deviations in the power source signal. The power converter output signal is said to be in regulation when provided within the specified circuit input voltage tolerances.

Because the components of the power converter device also dissipate power, it is desirable that the power converter be designed to function as efficiently as possible in regulating its output. The less efficient (in terms of power dissipation) the power converter, the faster the power source will be dissipated, and the useful life of the portable electronic device for a given battery charge will be shortened proportionately.

One particular type of power converter used in portable electronic device applications is the switch-mode power converter. Switch-mode power supplies are used to convert a varying source voltage (such as that provided by a battery power source as it is discharged over time) to a higher or lower controlled voltage output. The switching action of the converter converts the DC voltage provided by the power source into an AC signal in the form of a square wave, which is then filtered to remove the high frequency components and create a regulated DC output voltage. The control signals are modulated to control the transfer of power from the input of the power converter to its output, and to regulate the output voltage to the desired value.

Figure 1:
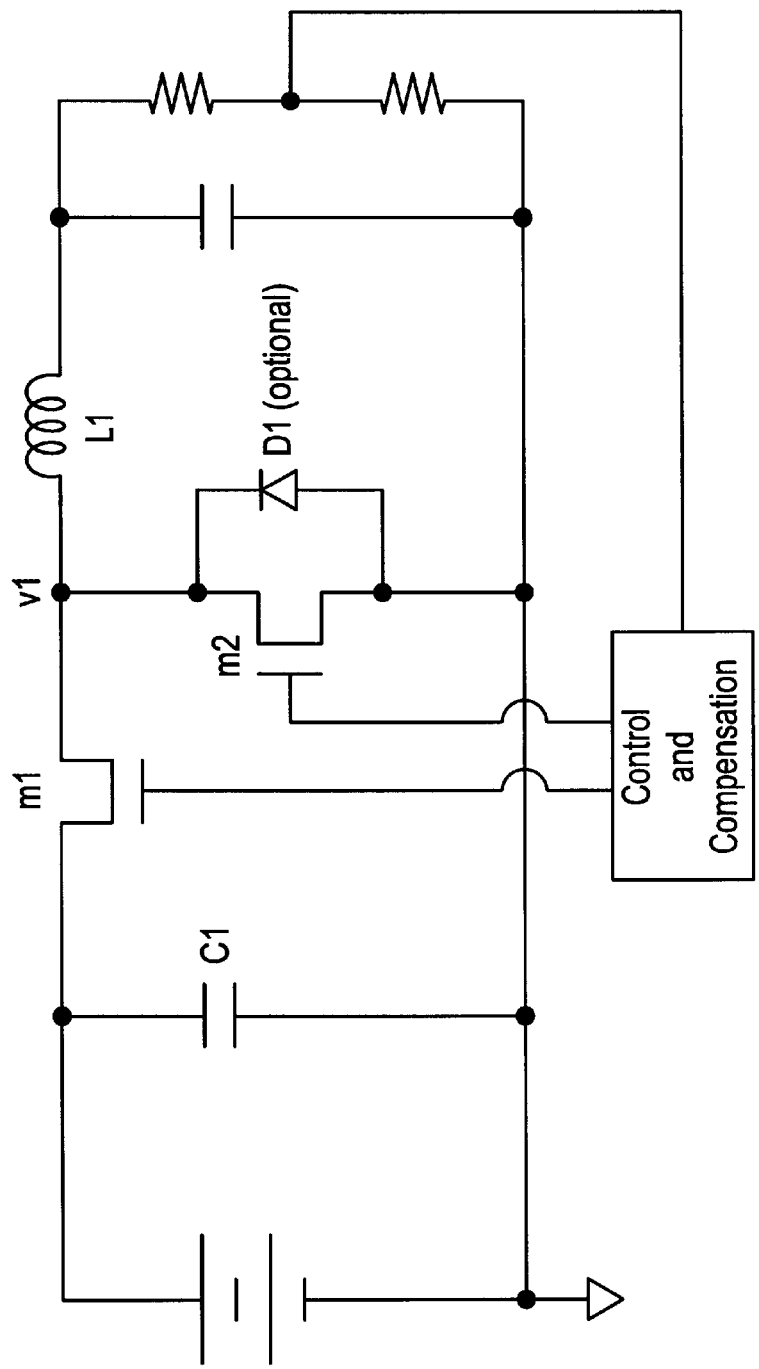
FIG. 1 is a schematic diagram of a switched mode power converter circuit in accordance with the buck topology.

The basic elements of a switch mode power converter consist of the power switch devices, an inductor and capacitor for energy storage and filtering, and a feedback/control circuit to modulate the switch timing to regulate the output voltage. Several different topologies of switch mode power converter can be created by connecting these elements in different configurations. A block diagram of the buck topology, commonly referred to as a buck converter, is shown in FIG. 1. This topology is typically used in battery-powered applications to convert the battery voltage to a regulated output voltage at a lower value.

In order to generate a given output voltage, a buck converter requires a minimum input voltage. If the input voltage is too low, the power converter will not be able to generate the output voltage, and the output will go out of regulation. The required minimum differential voltage is approximated by Equation 1:

$$\text{Vin/Vout} \approx \text{Dmax}^*(\text{Pout}/(\text{Pout}+\text{Pdis})) \qquad \text{Equation 1}$$

where "Pout" is the output power of the converter (i.e., the power delivered to the load) and "Pdis" is the power dissipated in the parasitic resistances of the power train elements. The power train elements are the elements through which power flows from input to output and consist of the power switches, input and output capacitors, and output inductor, and the interconnects between them. "Pdis" does not include the power dissipated in the control circuit. "Dmax" is the maximum duty cycle at which the converter can operate, and is an indication of the maximum time that m1 can be in the "ON" state during a switching period. The maximum duty cycle is limited by several factors, including the finite time required to transition each power switch from "ON" to "OFF" and from "OFF" to "ON", the amount of "dead time" required after turning one switch "OFF" before turning the other switch "ON", propagation delays in the control and switch drive circuits, and the time required to perform any housekeeping functions (such as auto-zero cycles) that must be performed while m2 is on. These factors combine to require that m1 be "OFF" for certain period of time each cycle. Since the minimum "OFF" time is a fixed value, the maximum duty cycle will vary based on the actual switching frequency of the converter. This minimum "OFF" time becomes increasingly critical for high switching frequencies.

Figure 2:
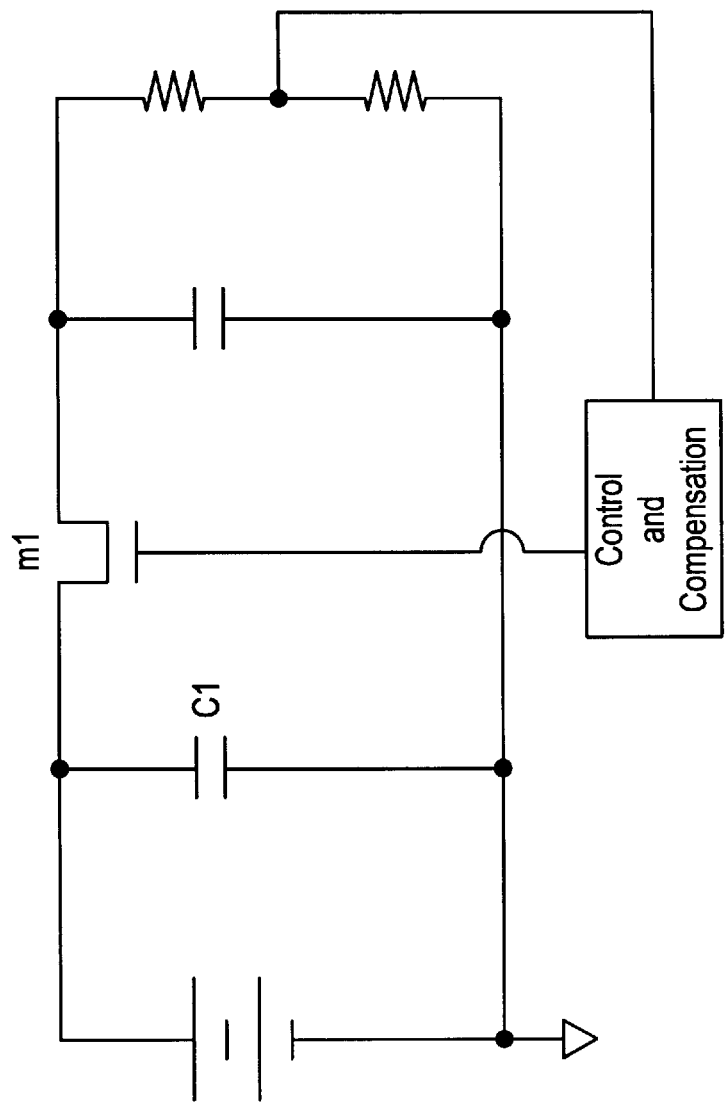
FIG. 2 is a schematic diagram of a linear regulator circuit.

Another type of power converter used in portable electronic device applications is the linear regulator, or low dropout (LDO) power converter. A linear regulator, an example of which is shown in FIG. 2, can operate at a smaller input-output differential voltage, often less than 100 mV, depending on the rated output current. The efficiency at high differential voltages is poor, but at low differential voltages, the efficiency of a linear regulator can approach that of a switch mode regulator. The efficiency of a linear regulator is approximated by equation 2, which is valid if the control circuit current is much smaller than the load current.

$$\text{Efficiency} = V_{out}/V_{in} \qquad \text{Equation 2}$$

One priority in the design of battery powered equipment is the maximization of the amount of time that the equipment can operate on a single battery charge. Combining the characteristics of a switch-mode regulator and linear regulator in a single regulator circuit can significantly increase this time. The switch-mode regulator has the advantage of operating at a higher (compared to the linear regulator) efficiency level when the difference between the input and output voltages are large, but cannot operate correctly at low differential voltages. The linear regulator has the advantage of operating at a lower differential voltage, but is not as efficient when operating at high differential voltages.

Because a switch-mode power converter can operate more efficiently at a higher input-output differential voltage, and a linear regulator can operate more efficiently at a smaller input-output differential voltage, providing a single power converter that includes both modes allows for efficient power conversion for both large and small voltage differentials. In a preferred embodiment of a converter according to the present invention, this is accomplished as follows: When the battery is fully charged, and the battery voltage is high, the combined converter operates in switching mode. As power is pulled from the battery, the battery voltage decreases, and eventually drops below the critical input voltage required for correct operation in switched mode. If the battery voltage drops below this voltage, the output of the converter will drop out of regulation, and the circuitry powered by the converter may fail to function properly. To avoid this condition, the converter according to the present invention switches to the linear mode of operation, and continues to maintain the correct output voltage, extracting more power from the battery and extending the time between required recharge cycles.

Other power converters approach this goal, but do not implement a true linear regulator mode in a single integrated power converter. For instance, a power converter can simulate linear regulator mode operation when, for example, the input-output differential voltage becomes too small thus requiring a duty cycle larger then "Dmax." In such a case, a power converter can implement a mode in which the device m1 as shown in FIG. 1 is switched to its fully "on" state and then maintained in its "on" state, instead of being switched between "on" and "off" states. If the switch m1 remains in its "on" state for a duration long enough to reach steady state condition, the output voltage of the converter will be defined by Equation 3.

$$V_{out} = V_{in} - (R_{m1} * I_{out}) \qquad \text{Equation 3}$$

where: $R_{m1}$ is the resistance of m1 in the "on" state, and $I_{out}$ is the load current.

If this output voltage is less than or equal to the desired power converter output voltage (which will occur at very small input-output differentials), then a stable condition results. If, however, the output voltage is above the desired power converter output voltage, then such a converter must cycle between the "switched" and "fully-on" modes of operation in order to regulate the output voltage. In other words, the converter will "switch" for a number of cycles as the output voltage falls below a set point, and then the converter will leave the switch in the "on" state for a period of time as the output voltage is pulled above the set point. The ratio of the time spent in each mode will vary based on input voltage, output voltage, and load current. The condition in which the output voltage in the steady-state "fully-on" mode is lower than the desired output voltage corresponds to a required duty cycle greater than 100%. The condition in which the converter must alternate between "fully-on" and "switched" modes corresponds to a required duty cycle greater than "Dmax" but less than 100%.

During the time that a converter thus alternates between "switched" and "fully-on" modes of operation, the ripple voltage on its output is higher than in normal operation in either its "switched" mode or "on" state. Furthermore, because of this alternating mode switching operation, the converter will generate noise over a range of varying frequencies. In particular, the frequency of the mode alternating, also described as the burst frequency, can fall within the audio range and cause unwanted sound artifacts in the device circuitry due to the mode switching noise.

Figure 3:
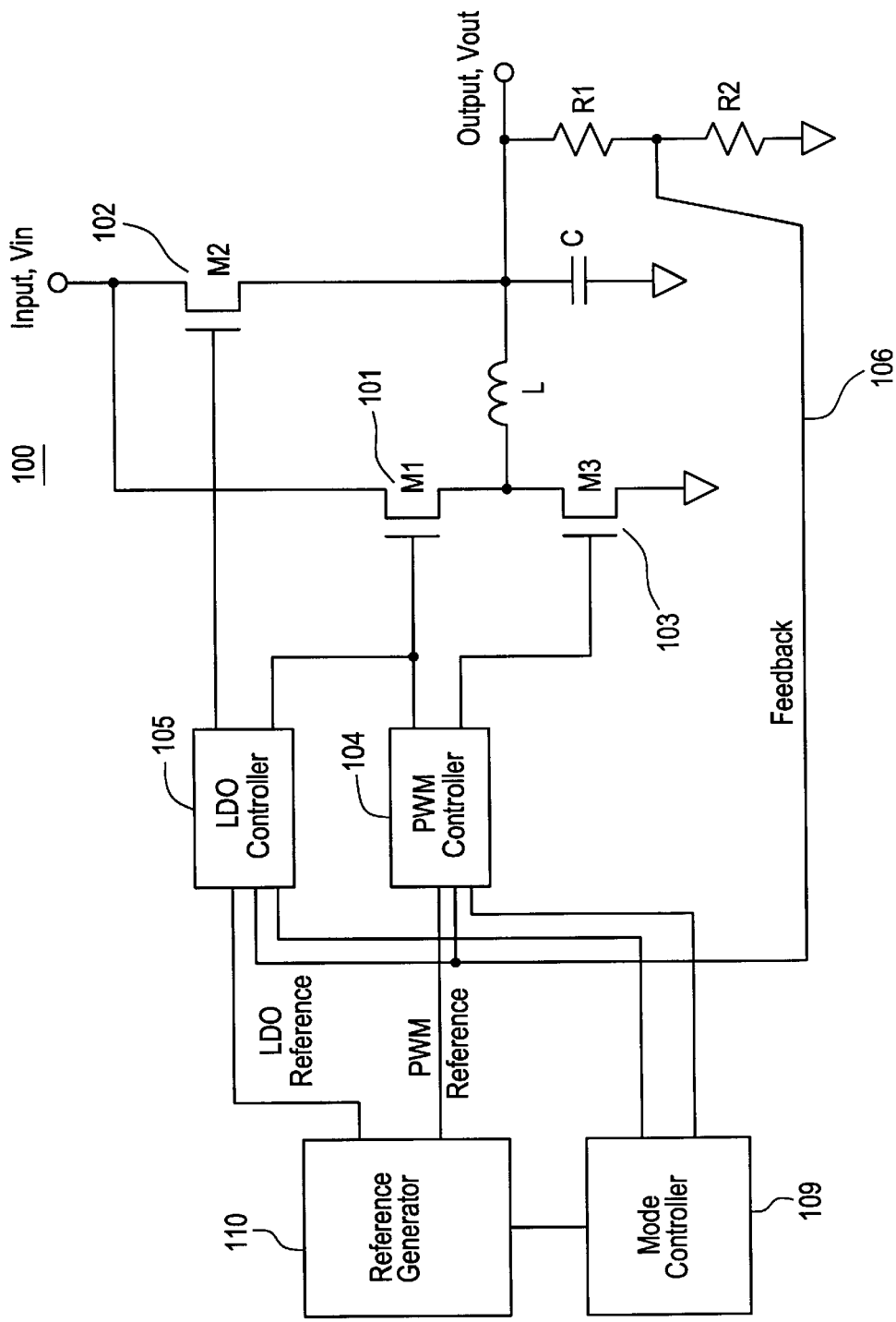
FIG. 3 is a schematic circuit diagram of a preferred embodiment of the present invention.

The present invention, in contrast, implements a true linear regulator mode of operation in which the power converter output voltage is regulated to prevent excessive voltage ripple and noise. FIG. 3 provides a schematic circuit diagram of a preferred embodiment of a converter according to the present invention.

Applicants fully incorporate herein the specification of an additional application relating to power converters filed by Cadence Design Systems on the same date as the filing of the present application: application Ser. No. 09/513,338 entitled "ULTRA-LOW POWER SWITCHING REGULATOR METHOD AND APPARATUS WITH ADAPTIVELY ADJUSTABLE SWITCHING FREQUENCY AND PEAK CURRENT TRIP POINT."

Referring now to FIG. 3, a converter 100 includes a Low Dropout controller (LDO) 105, a Pulse Width Modulation controller (PWM) 104, current control devices 101–103, a feedback signal 106, a mode controller 109, a reference generator 110, and various passive components including an inductor L, Capacitor C, and resistors R1 and R2. The control signal for current control device 102 is controlled by the output of LDO 105. The control signal for current control device 103 is controlled by the output of PWM 104.

The control signal for current control device 101 is controlled by the outputs of LDO 105 or PWM 104. Mode controller 109 determines which block has control of current control device 101 at any given time, so that LDO 105 and PWM 104 do not try to control current control device 101 at the same time. LDO 105 and PWM 104 determine their respective outputs in response to the voltage differential between a reference signal, provided by reference generator 110, and feedback signal 106. The error signal input of feedback signal 106 is determined by stepping down the converter 100 output voltage, Vout, using the series resistor arrangement of R1 and R2 as shown in is FIG. 3. Mode controller 109 includes logic to control the operation of PWM 104 and LDO 105 by controlling the outputs of reference generator 110 and mode control signals to PWM 104 and LDO 105 in order to transition converter 100 between switched and linear regulator modes of operation as described herein.

Figure 3A:
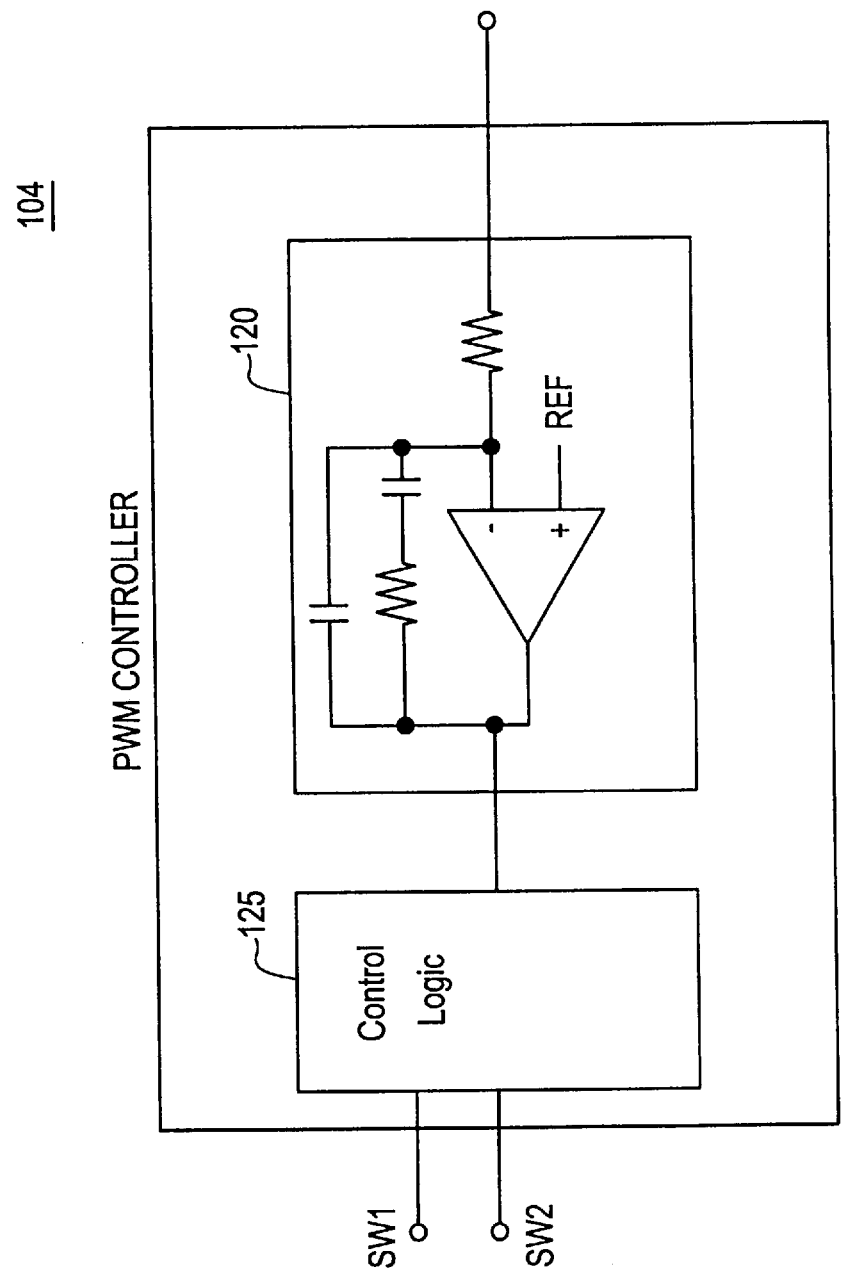
FIG. 3A is a schematic circuit diagram of a PWM control loop integrator for a preferred embodiment of the present invention.

In a presently preferred embodiment, PWM 104 further includes a PWM control loop integrator 120 and PWM control logic 125. PWM control loop integrator 120 preferably includes an operational amplifier integrator circuit as shown in FIG. 3A. Use of an operational amplifier integrator circuit provides for increased DC gain which in turn provides improved steady state accuracy of the PWM control loop. Referring now to FIG. 3A, PWM control loop integrator 120 resistor and capacitor components may be chosen to shape the frequency response of the feedback circuit to match that of the circuit under control. The time required for the operational amplifier to generate the required voltage across the feedback capacitors of PWM control loop integrator 120 is a function of the capacitor values and the maximum output current of the amplifier.

Current control devices 101 and 103 are used in a switched mode control loop in which converter 100 produces is a DC output voltage, Vout, under PWM 104 control. In a preferred embodiment, current control devices 101, 102 and 103 are metal oxide semiconductor field effect transistors (MOSFETs), as indicated by M1, M2 and M3, respectively, in FIG. 3. MOSFET M1 is preferably used as the main switch and MOSFET M3 is preferably used as the synchronous rectifier. Current control device 101 is also used as the pass device when converter 100 is in linear regulator mode.

Referring again to FIG. 3, operation of converter 100 is described as follows. When the input voltage, Vin, from the power source drops below a level necessary for efficient switched mode operation, converter 100 transitions to a linear regulator mode of operation. In this linear regulator mode, current control devices 101 and 102 are preferably used as pass devices instead of switches. The control signals for current control devices 101 and 102 are modulated in an analog fashion to vary the effective resistance of current control devices 101 and 102, thereby controlling the voltage dropped across current control devices 101 and 102. In a preferred embodiment, the gates of MOSFETs M1 and M2 are modulated in an analog fashion to vary the effective resistance of the devices, thereby controlling the voltage dropped across MOSFETs M1 and M2. As a result, converter 100 can produce a regulated output voltage, Vout, without alternating between modes of operation. This prevents generation of excessive voltage ripple and noise otherwise associated with alternating between switched and linear modes of operation.

Further, a single integrated current control device 101 operates as either a switch or a variable resistance device (i.e., a device which can be controlled to drop varying amounts of voltage across the device) in order to support different modes of operation for converter 100.

In a preferred embodiment, the optimum size of MOSFET M1 required for switched mode operation is smaller than that required for linear mode. As a result, additional MOSFET area needs to be added to reduce the series resistance of the pass device. This extra MOSFET is represented by M2.

The location of the second current control device 102 between the input and the output nodes allows two significant problems to be solved. These two problems can be summarized as: (1) The effect of the pole doublet due to the LC filter, which increases the difficulty of compensating the feedback loop of the linear regulator portion of converter 100; and (2) The delay associated with the stabilization of the PWM control loop integrator 120, which causes large output transients during the transition from linear to switching mode.

Turning to the first problem, converter 100 requires a inductor L and capacitor C arranged as an LC filter in the switched mode control loop for operation in switched mode operation including, but not limited to, pulse width modulation (PWM) or pulse skipping mode (PSM). When converter 100 is operating either in linear mode or in a transition mode between switched mode and linear regulator mode using the transition control loop, the LC filter is coupled to the LDO 105 feedback loop. The inductor L and capacitor C introduce two additional poles into the feedback path of the linear regulator control loop. The presence of these additional poles increases the difficulty of effecting frequency compensation of the linear regulator control loop. In particular, very large capacitor values are required which have as a consequence unacceptable transient response on the control of the output voltage.

Figure 4:
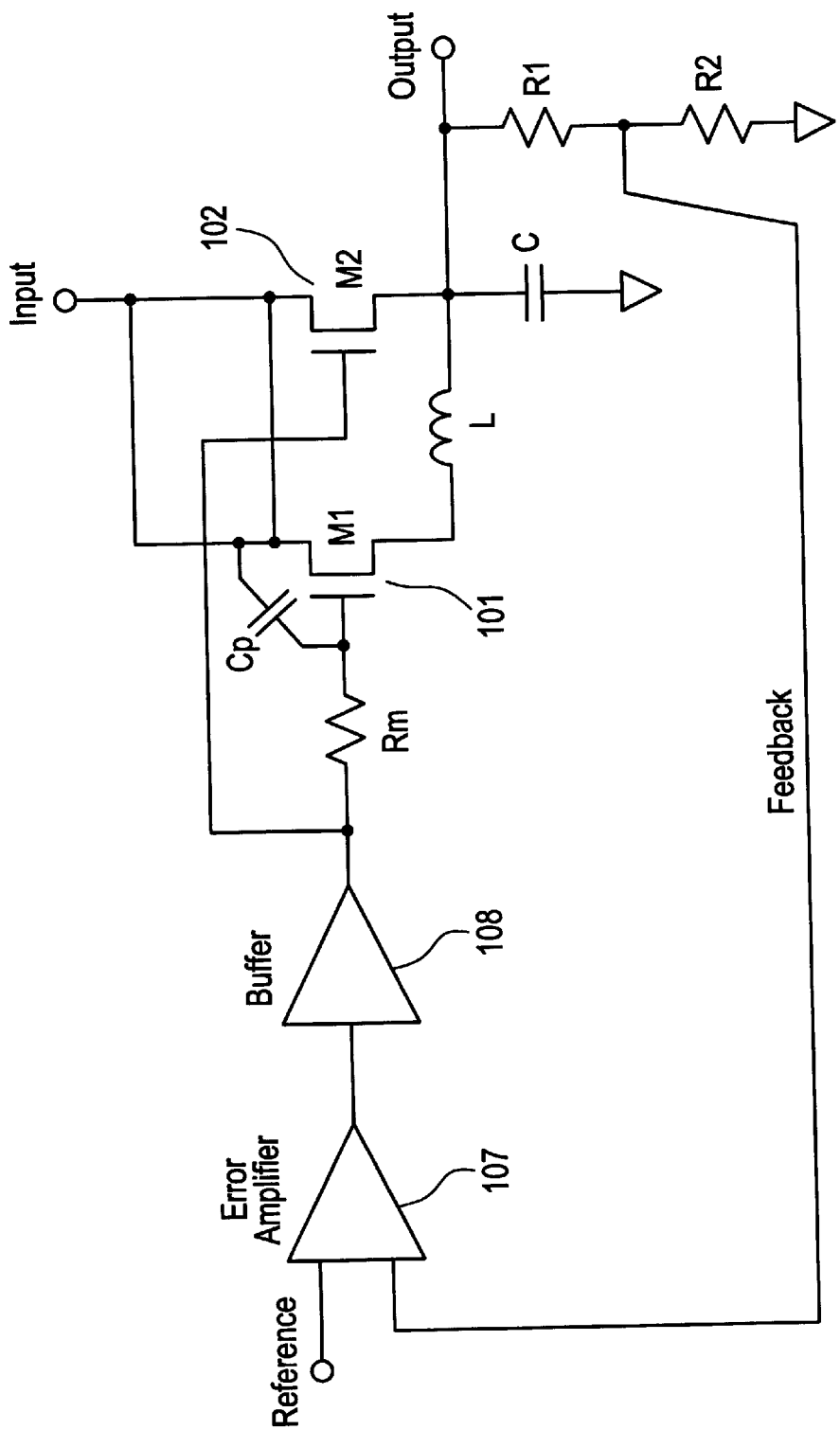
FIG. 4 is a schematic block diagram of a most preferred embodiment of the present invention in which unwanted effects caused by the presence of a double pole are reduced.

Referring to FIG. 4, in a preferred embodiment, feedback signal 106 includes an error amplifier 107 and a buffer 108. Error amplifier 107 receives a raw error signal, which is the stepped down output voltage, Vout, produced from the series resistor arrangement of R1 and R2, and a reference signal and produces an amplified error signal with amplitude dependent upon the difference between the raw error signal and the reference. Buffer 108 receives the amplified error signal from error amplifier 107 and provides a buffered error signal to current control devices 101 and 102. The effect of the two poles introduced by the LC filter is overcome by making feedback signal 106 current flow predominantly through current control device 102 to the exclusion of current control device 101 for the high frequency components of the feedback control signal 106. In a preferred embodiment, this is accomplished by: (1) Introducing a resistor, Rm, in series with current control device 101 (which is acting as the main power device), that in combination with the parasitic input shunt capacitance, Cp, of current control device 101, creates a dominant pole, and (2) Coupling current control device 102 to the output of converter 100 after the LC filter.

A preferred embodiment of this arrangement (excluding the switched mode control loop) is shown in FIG. 4. Referring now to FIG. 4, resistor Rm is placed in series with the gate of M1 only when M1 is operating in active mode, i.e. not as a switch.

In an alternative embodiment, a stable closed loop configuration is achieved by providing error amplifier 107 with a very low frequency dominant pole in order for the open loop frequency response to reach the unity gain value (0 dB), $f_u$, before encountering the double pole at the resonant frequency, $f_{LC}$, of the LC filter.

Figure 5A:
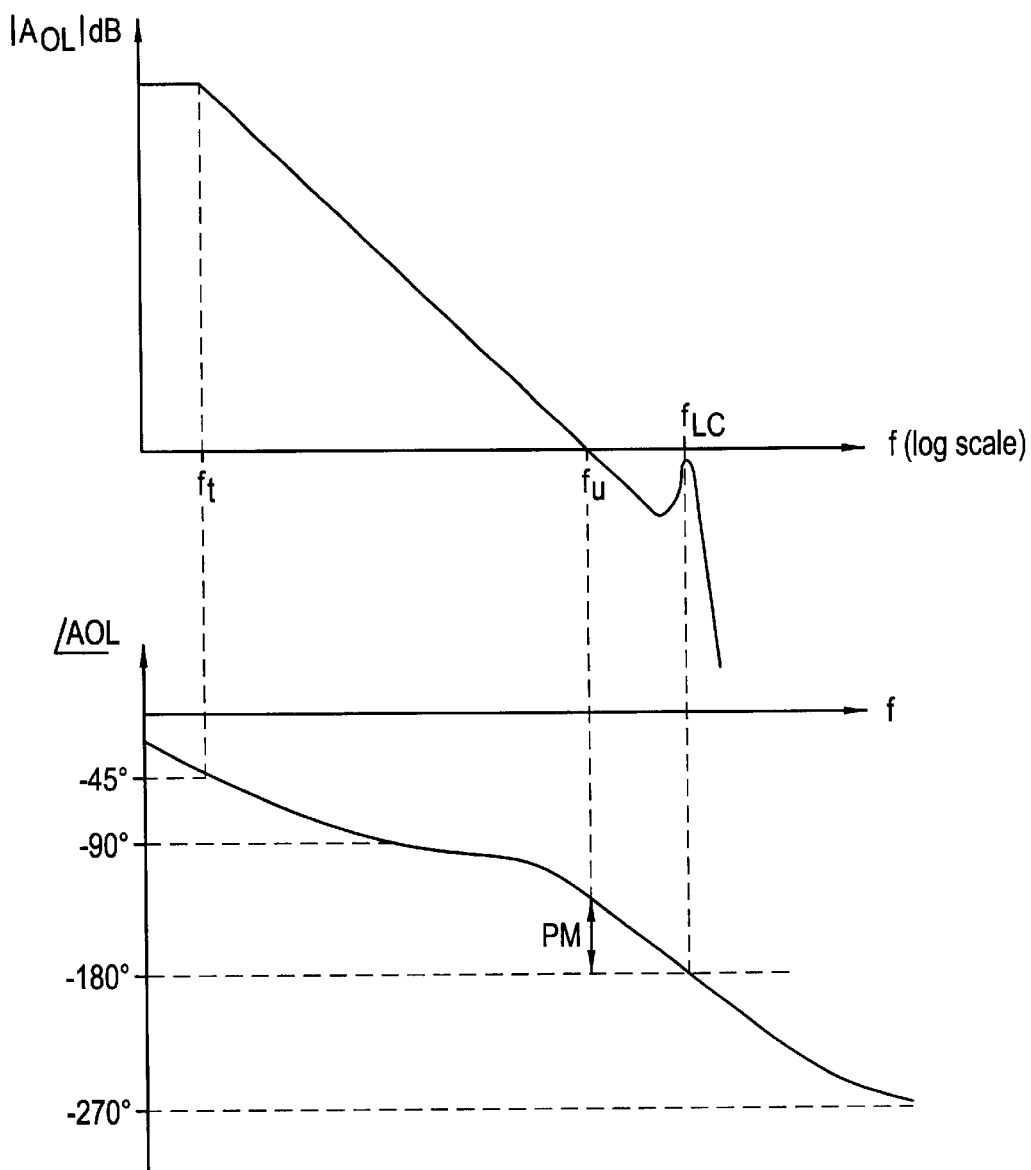
FIG. 5A is a Cartesian bode plot diagram illustrating the open loop frequency response showing double pole effects.

The crossover frequency determined by the dominant pole is inversely proportional to the value of the capacitor used for the compensation. Thus, a relatively higher capacitance C is required to lower the unity gain frequency $f_U$ with respect to the resonant frequency $f_{LC}$, as shown in FIG. 5A.

In addition to requiring higher capacitance, transient response is adversely affected.

For converter 100 according to FIG. 3, the total required capacitance value to be introduced in order to counteract the effect of the double pole is preferably at least 10 nanofarads. In a first alternative embodiment, a capacitor is added to an IC implementation having the desired capacitance value. For integrated circuit (IC) implementations, shunt capacitance increases as the surface area increases (for example, the gate size of the logic implementing current control device 101). To provide a device having a parasitic capacitance of at least 10 nanofarads, however, requires a prohibitively large amount of IC surface area (e.g., Silicon area). This alternative is therefore limited in terms of practical use because of the prohibitive cost in terms of Silicon area (i.e., "chip real estate").

In a second alternative embodiment, external components (e.g., external to an IC) are used to provide the desired dominant pole at a lower frequency.

In a preferred embodiment, as described in FIG. 4, the parasitic capacitance already present from current control device 102 is used to contribute to the total capacitance required, in order to conserve IC surface area. The frequency behavior of the open loop gain of this preferred embodiment is shown in FIG. 5B.

Figure 5B:
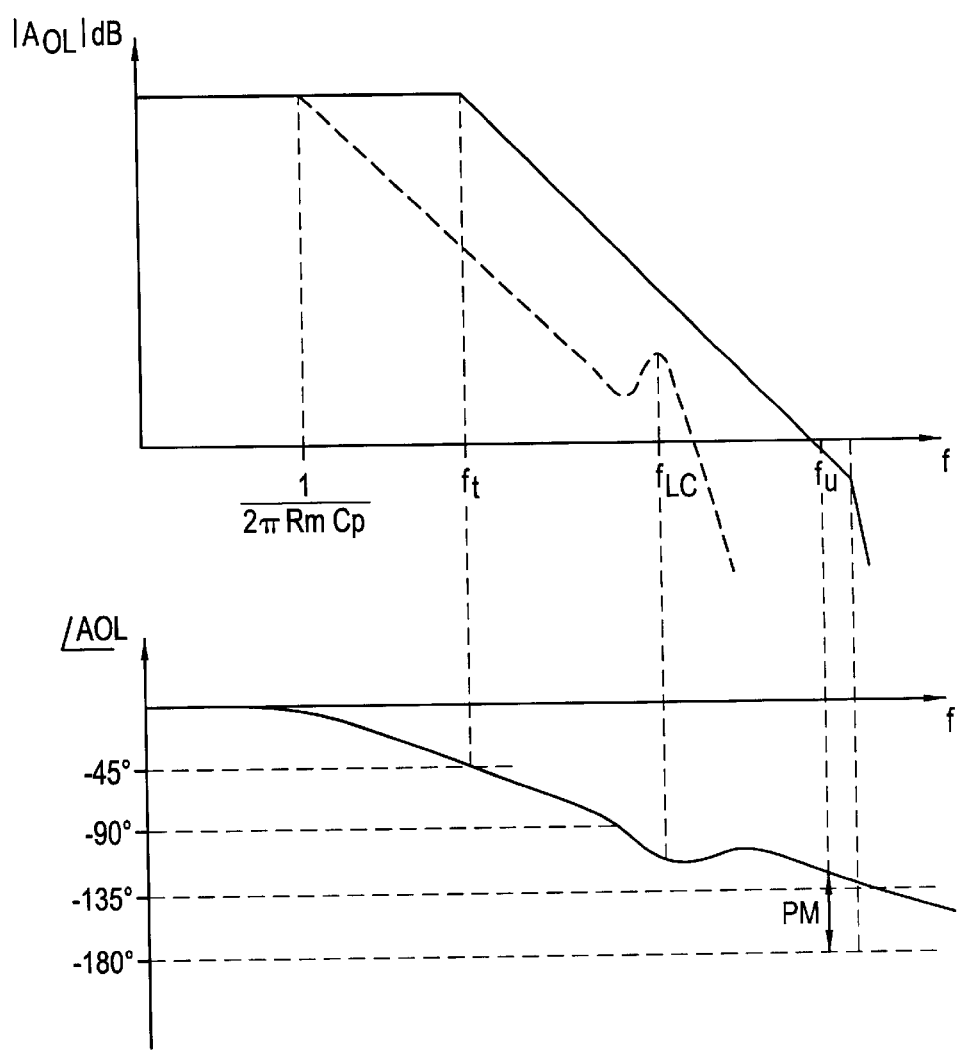
FIG. 5B is a Cartesian bode plot diagram illustrating the open loop frequency response of a preferred embodiment of the present invention after reduction of the double pole effects.

Referring now to FIG. 5B, inserting the series resistance, Rm, along with the parasitic shunt capacitor, Cp, creates a dominant pole in the loop including M1 at frequency fp=1/(2π•Rm•Cp). In this way, the loop including M2 will be dominant for higher frequency. For this approach: (a) It is not necessary that $f_{LC} > f_U$ (e.g., resonance can occur when the gain is still greater than 1); and (b) $f_t > f_p$. Therefore, in a preferred embodiment, converter 100 provides control loop stability with the same phase margin (PM) using compensation capacitors that are orders of magnitude smaller that can be integrated on chip. Further, the transient response of the system is not overly penalized. Finally, the area occupied by the extra transistor M2 is needed anyway, because the optimum size of M1 for switching operation is in general smaller (40%) than the optimum size needed in LDO mode. In a preferred embodiment, this extra area is provided by M2.

Turning now to switched mode control loop stabilization, the present invention also implements a method for transitioning between linear regulator mode and switched mode that pre-stabilizes the switched mode control loop. In a preferred embodiment, PWM 104 of the switched mode control loop further includes an integrator to increase the DC gain of the system and to improve DC regulation of converter 100. The integrator also allows the use of a smaller output filter capacitor, C, than would be possible if only broadband gain was used in the switched mode control loop. The presence of the integrator requires a finite amount of time for the PWM 104 error voltage (i.e., the output of PWM control loop integrator 120) to settle to the correct value to regulate the output voltage. During normal operation, the error voltage settles to an initial voltage during startup. Once converter 100 is running, the error voltage only needs to move far enough to adjust for line and load variations, which is usually small compared to the overall error voltage range.

When converter 100 switches between linear regulator mode and switched mode, the correct value of the error voltage is indeterminate. The switched mode control loop has been disabled, and as a result PWM control loop integrator 120 is not at the correct voltage to correctly regulate the output. Converter 100 must slew the error voltage to the correct value before the output will be regulated to the desired voltage. If the error amplifier is designed with the slew rate necessary for this situation it will have a higher slew rate capability (and draw more power) than necessary during normal operation.

Therefore, converter 100 of the present invention solves the problem a different way. Instead of switching directly from the linear regulator control loop to the switched mode control loop, converter 100 switches through an intermediate mode in which both the linear regulator control loop and the switched mode control loop share control of the output voltage. Referring again to FIG. 3, the transition method of the present invention is described as follows:

1) The switched mode loop is enabled, and the linear regulator loop releases control of current control device 101. The linear regulator loop continues to regulate the output voltage by retaining control of current control device 102. In this configuration, the linear regulator loop can source current into the load, but cannot sink current from it. As a result, the linear regulator loop can prevent the output from dropping below a set voltage; however, if the switched mode loop drives the output above that voltage, all the linear regulator loop can do is turn off current control device 102. To use this characteristic, PWM 104 of the switched mode control loop is set to regulate to a slightly higher than desired voltage, and LDO 105 of the linear regulator control loop is set to regulate to a slightly lower than desired voltage. This is accomplished by modifying the reference voltage supplied to the two loops. To start PWM 104 at its minimum output level, the integration capacitor in the switched mode control loop is initially discharged.

2) Once the switched mode control loop is enabled, PWM 104 senses that the output is below the desired voltage and begins to charge the integrator capacitor to raise the error voltage and increase the output power. The linear regulator control loop prevents the output voltage from dropping below its modified setpoint (which is slightly below the modified setpoint of the switched mode control loop).

3) Eventually, the error voltage reaches the level that corresponds to the output voltage supported by the linear regulator control loop. As the error voltage increases beyond that point, the switched mode control loop takes over from the linear regulator control loop, and the output voltage begins to increase. When the linear regulator control loop sees that the output is above its modified set point, LDO 105 begins to turn off current control device 102.

4) When the switched mode control loop has raised the output voltage far enough above the linear regulator control loop's modified setpoint, the LDO 105 fully turns off current control device 102. A signal from the LDO 105 alerts mode controller 109 that the current through current control device 102 has dropped to zero, indicating that the linear regulator control loop can be shut down, and control can be passed completely to the switched mode control loop. At this point, the PWM 104 integration capacitor has been precharged to the correct value and the error voltage is at the correct level to regulate the output voltage.

5) PWM 104 of the switched mode control loop is set to regulate to the correct output voltage.

A preferred embodiment of mode controller 109 is implemented in accordance with the logic state diagrams described in FIGS. 6A, 6B, 6C and 6D. Mode transition of converter 100 is accomplished in accordance with state transition logic executed by mode controller 109 and described as follows.

In a preferred embodiment, converter 100 provides a variety of operating modes including primary modes of operation and transition or intermediate modes of operation. Primary modes include, but are not limited to, a switched mode (e.g., PWM mode) and a linear regulator mode (i.e., LDO mode). Intermediate modes of operation include, but are not limited to, a "share_PWM" mode and a "share_LDO" mode.

PWM mode corresponds to the switched mode operation of converter 100. PWM mode is characterized by current control device 101 being switched between its "on" and "off" states. The output voltage, Vout, of converter 100 is determined by the duty cycle of current control device 101, where duty cycle is defined as the ratio of "on" time to the total switching period. Thus, in PWM mode, Vout is controlled by modulating the duty cycle of current control device 101.

Switched mode operation also includes, without limitation, Pulse Skipping Mode (PSM), in which current control device 101 is switched at a variable frequency instead of a fixed switching frequency as in PWM mode. Further, current control device 101 may cease to be switched for a certain period of time, at the end of which time switching is resumed. Thus, in PSM mode, Vout is controlled by modulating the switching frequency of current control device 101.

LDO mode corresponds to linear regulator mode as described herein.

Share_PWM mode is an intermediate mode of operation that defines converter 100 operational state during transitions between PWM and LDO modes. In Share_PWM mode, generally, PWM 104 regulates converter 100 output voltage to the desired value and LDO 105 cooperates in regulating Vout by preventing Vout from falling below a nominal range. For example, in a preferred embodiment, LDO 105 prevent Vout from falling below −2% of the desired output voltage. Other ranges are supported as well.

Share_LDO is an intermediate mode of operation that defines converter 100 operational state during transitions from Share_PWM mode to LDO mode and from PWM to LDO mode. In Share_LDO mode, generally, LDO 105 regulates converter 100 output voltage to the desired value and PWM 104 ramps down the current flowing through inductor L.

Transition from PWM mode to LDO mode can be initiated by one of several triggers. The primary trigger for transition from PWM to LDO mode is the detection of a maximum duty cycle condition (i.e., MaxDuty=1). Once converter 100 has reached maximum duty cycle, it cannot increase the duty cycle further to adjust for changes in input voltage or output current, and so is in danger of allowing the output voltage to drop out of regulation. This condition can occur over a range of input voltages and output currents, based on variations in temperature and external and internal component characteristics. By directly sensing maximum duty cycle, the present invention corrects for the uncertainties caused by these variations.

There are conditions for which it is not desirable to switch to linear mode, however, even when maximum duty cycle has been reached. The following triggers modify the transition control function:

1) Input→Output voltage differential (VinVoutH and VinVoutL). The difference between the input and output voltage is used both as an enabling signal and forcing signal for the transition from switching to linear mode.

a) VinVoutH=1: If the differential voltage is large enough that converter 100 should be able to correctly regulate the output voltage under all conditions (including temperature and process variations), the transition from switching to linear mode is disabled. This prevents converter 100 from transitioning into linear mode due to a load transient or fault condition.

b) VinVoutL=1: If the differential voltage is too low for converter 100 to meet its performance specifications under any conditions, it will be forced to transition to linear mode. This transition is delayed to filter out transient conditions.

c) VinVoutH=0 & VinVoutL=0: For differential voltages between these two extremes, converter 100 is allowed to operate in switching mode until another trigger signal (MaxDuty or VinLow) is detected.

2) Input voltage (VinLow). For the converter 100 of the present invention, a critical input voltage exists below which converter 100 may not function properly in switching mode. If the input drops below this voltage, converter 100 is forced to transition into linear mode.

Figure 6A:
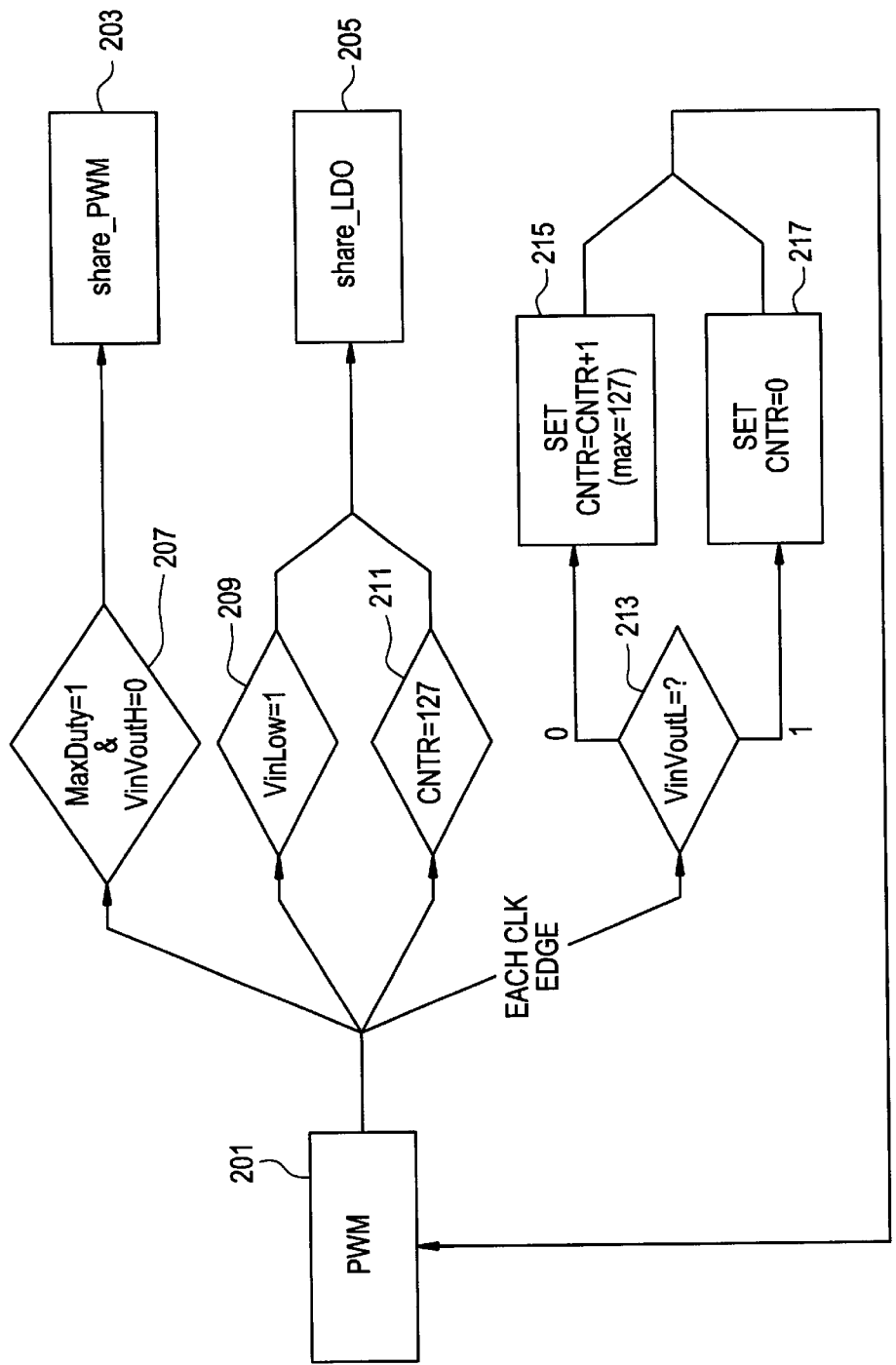
FIG. 6A is a state diagram description of transition from switched mode to intermediate modes of operation.

Referring now to FIG. 6A, mode controller 109 operating in switched mode, or pulse width modulation (PWM) mode (block 201), transitions converter 100 operating mode to Share_PWM mode (block 203) or Share_LDO mode (block 205) in response to changes in the states of certain parameters.

In block 207, if the maximum possible switching duty cycle has been reached (i.e., MaxDuty=1) and the difference between Vin and Vout is within the range for possible transition to LDO mode (i.e., VinVoutH=0), then mode controller 209 transitions converter 100 from PWM mode to Share_PWM mode of operation (block 203). In a preferred embodiment, MaxDuty=1 if the leading edge of the switching frequency clock signal arrives in time before the leading edge of the comparator output signal of feedback signal 106; otherwise, MaxDuty=0. This condition indicates that switch M1 is being turned off by the clock signal, rather than by the feedback circuit. The feedback circuit calling for a duty cycle that is larger than (Dmax) that permitted by the switching frequency.

In a preferred embodiment, VinVoutH=1 if Vin−Vout≧600 mV (nominal) and VinVoutH=0 if Vin−Vout<600 mV (nominal). Thus, a transition to LDO mode is facilitated when conditions indicate that Vout could go out of regulation if pure PWM mode of operation is maintained. Gating the transition with VinVoutH avoids unwanted transitions during over-current conditions.

In block 209, if Vin drops below a predetermined value (i.e., VinLow=1), then mode controller 109 transitions converter 100 operation from PWM mode (block 201) to Share_LDO mode (block 205). This avoids converter 100 operating relatively inefficiently in PWM switched mode in the presence of low input voltages. For example, in a preferred embodiment, VinLow=1 when Vin<2.3V.

Blocks 211, 213, 215, and 217 operate as follows: If the difference between Vin and Vout has fallen below a preset minimum value (i.e., VinvoutL=0) (block 213) for a predefined consecutive number of switching clock edges (block 215), then mode controller 209 transitions converter 100 from PWM mode to Share_LDO mode of operation (block 205). The state of VinVoutL is checked on each clock edge (block 213). If VinVoutL=1 at any clock edge, then the counter is reset to zero (block 217). If VinVoutL=0 at any clock edge, then the counter is incremented by one (block 215). If the counter increments to a predefined number of consecutive clock edges in which VinVoutL=0, then mode controller 209 transitions converter 100 from PWM mode to Share_LDO mode. In a preferred embodiment, the counter increments to 127 clock edges before transitioning control (block 211). In a preferred embodiment, VinVoutL=1 if Vin−Vout>350 mV (nominal); otherwise, VinVoutL=0. The counter prevents unwanted switching due to transients (i.e., debounce).

Figure 6B:
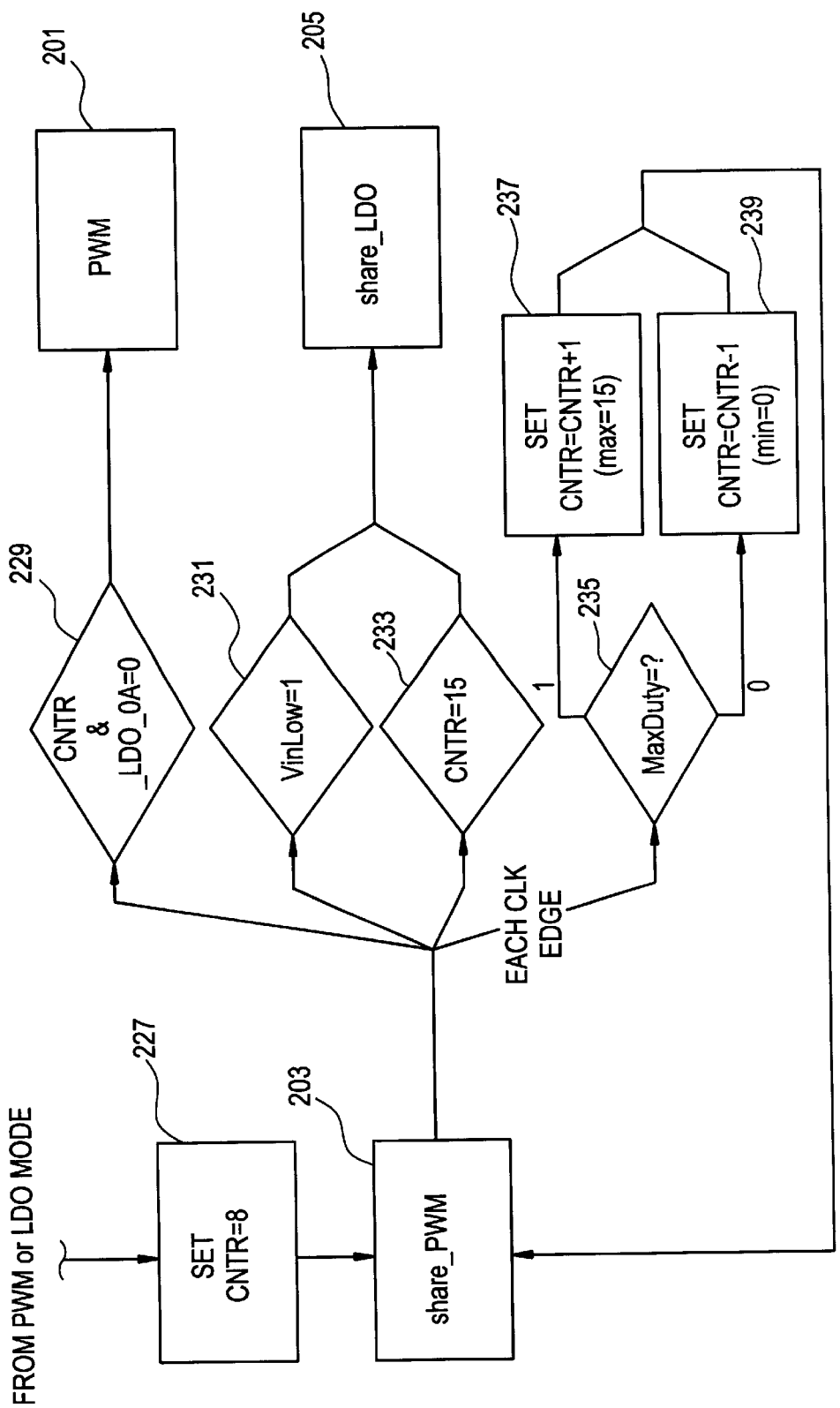
FIG. 6B is a state diagram description of transition from switched mode or LDO mode to a second intermediate mode or PWM mode of operation.

Referring now to FIG. 6B, mode controller 109 operating in Share_PWM mode (block 203) transitions converter 100 operating mode to PWM mode (block 201) or Share_LDO mode (block 205) in response to changes in the states of certain parameters as follows. In block 227, the switching clock edge counter is set to a predefined value (e.g., CNTR=8), upon entry into Share_PWM mode. Share_PWM mode exists to allow the mode control circuit to delay the decision to transition from switching to linear mode. This mode is entered from PWM mode when the MaxDuty condition is detected, and from LDO mode when attempting the transition into PWM mode.

Exit from Share_PWM mode is determined as follows:
1) Share_PWM mode transitions to PWM mode when the PWM loop brings the output voltage into regulation. CNTR counts down because the PWM is operating at less than maximum duty cycle, and the LDO turns off because the output voltage is above its modified set point.
2) Share PWM mode transitions to SHARE_LDO mode when either:
   a) The PWM cannot bring the output voltage into regulation. CNTR counts up because the PWM continues to operate at maximum duty cycle. Or,
   b) Input voltage drops below critical voltage. VinLow signal triggers the transition.

Specifically, in block 229, if the switching clock edge counter equals zero (e.g., CNTR=0) and LDO 105 is not supplying current to the load (e.g., _LDO_OA=0), then mode controller 209 transitions converter 100 from Share_PWM mode (block 203) to PWM mode of operation (block 201).

In block 231, if Vin drops below a predetermined value (i.e., VinLow=1), then mode controller 109 transitions converter 100 operation from Share_PWM mode (block 203) to Share_LDO mode (block 205). For example, in a preferred embodiment, VinLow=1 when Vin>2.3 V.

Blocks 233, 235, 237, and 239 operate as follows: If the maximum duty cycle has been reached (i.e., MaxDuty=1) for a predefined greater number of switching clock edges than for MaxDuty=0 (block 233), then mode controller 209 transitions converter 100 from Share_PWM mode to Share_LDO mode of operation (block 205). The state of MaxDuty is checked on each clock edge (block 235). If MaxDuty=0 at a clock edge, then the counter is decremented by one (block 239). If MaxDuty=1 at a clock edge, then the counter is incremented by one (block 237). If the counter increments to a predefined number of clock edges in which MaxDuty=1 that is greater than the number of clock edges in which MaxDuty=0, then mode controller 209 transitions converter 100 from Share_PWM mode to Share_LDO mode. In a preferred embodiment, the counter counts 15 clock edges before transitioning control (block 233). The counter prevents unwanted switching due to transients (i.e., debounce).

Figure 6C:
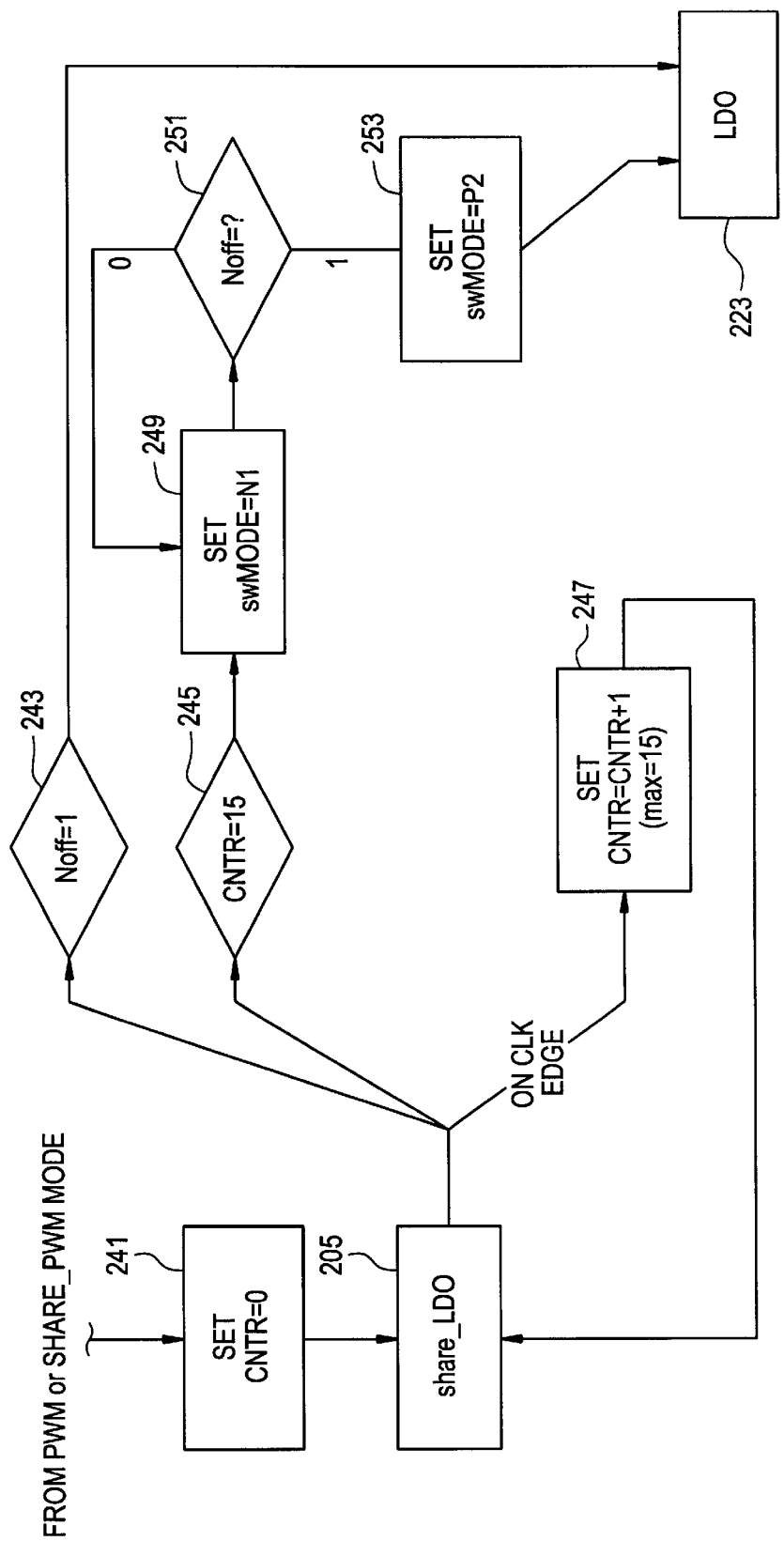
FIG. 6C is a state diagram description of transition from switched mode or an intermediate mode to LDO mode of operation.

Referring now to FIG. 6C, mode controller 109 operating in Share_LDO mode (block 203) transitions converter 100 operating mode to LDO mode (block 223) in response to changes in the states of certain parameters as follows. In block 241, the switching clock edge counter is reset (e.g., CNTR=0) upon entry into this mode. Share LDO mode exists to allow a smooth transition into LDO mode by ramping down the current in the inductor before giving control of M1 to the linear loop. This creates a predictable condition (the inductor current is always zero when the linear loop gets control of M1), and prevents possible damage caused by voltage spikes that may be induced by abrupt changes in inductor current.

The only way to exit SHARE_LDO mode is to enter LDO mode as follows:
1) The PWM ramps inductor current down to zero within 15 switch cycles because of the modified reference voltages. The Noff signal causes entry into LDO mode.
2) The PWM does not ramp the inductor current down to zero within 15 switch cycles. In this case the switching action of the PWM is halted with switch M3 in the "ON" state. The inductor current is monitored, and the Noff signal causes entry into LDO mode.

Specifically, in block 243, if the current through current control device 103 is zero or negative (i.e., Noff=1), then mode controller 209 transitions converter 100 from Share_LDO mode (block 205) to LDO mode (block 223). In a preferred embodiment, a comparator detects negative current flow in current control device 103 and asserts a signal indicating this condition (Noff=1) to mode controller 109.

Blocks 245, 247, 249, 251, and 253 operate as follows: For each switching clock edge in which converter 100 is operating in Share_LDO mode, a counter is incremented by one (block 247). After the switching clock edge counter has reached 15 (block 245), mode controller 109 sets the states of current control devices 101 and 103 to "off" and "on," respectively (block 249). LDO 105 retains control of current control device 102. Current control devices 101 and 103 are then maintained in these states until the current through current control device 103 is negative (i.e., Noff=1) (block 251), at which time mode controller 109 sets the states of current control devices 101 and 103 to "off" and "off," respectively (block 253), and transitions converter 100 to LDO mode (block 223). LDO 105 retains control of current control device 102, and takes control of current control device 101.

Figure 6D:
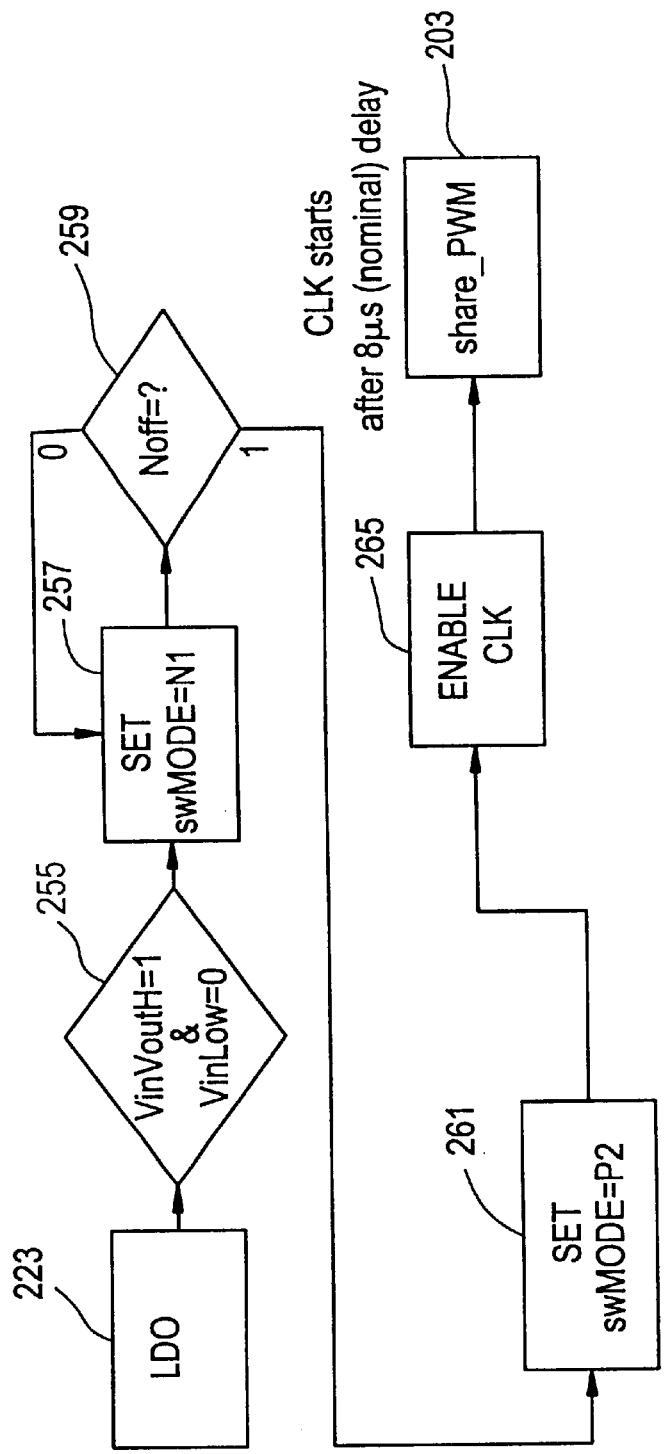
FIG. 6D is a state diagram description of transition from LDO mode to an intermediate mode of operation.

Referring now to FIG. 6D, mode controller 109 operating in LDO mode (block 223) transitions converter 100 operating mode to Share_PWM mode (block 203) or PSM mode (block 219) in response to changes in the states of certain parameters as follows.

In block 255, when the difference between Vin and Vout for high-power output operation has exceeded a preset maximum value (i.e., VinVoutH=1), and VinLow=0 as described above, then mode controller 109 sets the states of current control devices 101 and 103 to "off" and "on," respectively (block 257). LDO 105 retains control of current control device 102. Current control devices 101 and 103 are then maintained in these states until the current through current control device 103 is zero or negative (i.e., Noff=1) (block 259), at which time mode controller 109 sets the states of current control devices 101 and 103 to "off" and "off," respectively (block 261). LDO 105 retains control of current control device 102. Thereafter, mode controller 109 transitions converter 100 operating mode to Share_PWM mode (block 203) after first enabling the switching clock (block 265). The switching clock signal is present nominally 8 microseconds after being thus enabled.

Thus, a method and apparatus for transitioning a power converter between a switched mode of operation and a linear regulator mode of operation in a single power converter has been shown that:

1) Implements a true linear mode of operation, which can regulate the output voltage to the desired value without alternating between switched and linear modes;
2) Eliminates the large ripple voltages experienced during the transition between switching and linear modes; and
3) Eliminates the noise at varying frequencies caused by the alternation between switching and linear modes.

Further, the present invention solves several of the problems associated with the implementation of a linear mode of operation in a switched mode converter in that it:
1) Eliminates the effect of the double pole formed by the LC filter inductor, allowing the linear regulator control loop to be closed at a higher frequency; and
2) Provides a means for stabilizing the switched mode control loop when the input voltage increases to the point that the converter can sustain the desired output voltage in switched mode operation.

While the above description contains many specifics, these should not be construed as limitations on the scope of the invention, but rather as exemplification. Other variations are possible. Accordingly, the scope of the present invention should be determined not by the embodiments illustrated above, but by the appended claims and their legal equivalents.

What is claimed is:

1. A multi-mode controller comprising:
   a control circuit that produces an output signal, said control circuit having a switched mode control loop for regulating said output signal in accordance with switched mode operation, and a linear regulator control loop for regulating said output signal in accordance with linear regulator mode operation;
   said control circuit further having a transition control loop coupled to said switched mode control loop and said linear regulator control loop, said transition control loop providing an intermediate mode of operation in which said switched mode control loop and said linear regulator control loop cooperate to share control of said output signal.

2. The multi-mode controller of claim 1 wherein said control circuit further includes a mode controller.

3. The multi-mode controller of claim 1 wherein said control circuit further comprises a filter inductor coupled to said switch mode control loop to lower the circuit resonant frequency of said switch mode control loop.

4. The multi-mode controller of claim 3 wherein said filter inductor is implemented using components external to an integrated circuit.

5. The multi-mode controller of claims 1 or 3 wherein said controller is provided in a single integrated circuit device.

6. A method of transitioning a power converter between a switched mode of operation and a linear regulator mode of operation comprising:
   enabling a switched mode control loop during operation in linear regulator mode, said step of enabling further including releasing control of a first current control device by a linear regulator control loop, and continuing to regulate an output voltage by retaining control of a second current control device by said linear regulator control loop to prevent said output voltage from dropping below a set voltage;
   setting said switched mode control loop to regulate said output voltage to a slightly higher than desired voltage, said step of setting accomplished by modifying a reference voltage to said switched mode control loop;
   setting said linear regulator control loop to regulate said output voltage to a slightly lower than desired voltage, said step of setting accomplished by modifying a reference voltage to said linear regulator control loop;
   sensing by said switched mode control loop that said output voltage is below the desired regulation voltage;
   charging an integrator capacitor to increase an error voltage signal;
   increasing said output power in response to said error voltage signal;
   detecting a low output condition by said switched mode control loop and said linear mode control loop by determining an increase in said error voltage beyond the range of said output voltage provided by said linear regulator control loop;
   increasing said output voltage by said switched mode control loop in response to said step of detecting a low output condition;
   reducing the current flow through said second current control device by said linear regulator control loop in response to said step of detecting a low output condition;
   switching off said second current control device by said linear regulator control loop when said switched mode control loop has increased said output voltage above a modified set point;
   alerting a mode controller by said linear regulator control loop by sending a signal indicating that the current through said second current control device has dropped to zero;
   shutting down said linear regulator control loop by said mode controller;
   passing control to said switched mode control loop by said mode controller; and
   regulating said output voltage by said switched mode control loop to a desired output voltage.

7. A power converter, comprising:
   a first current control device that receives an input signal;
   a second current control device that receives said input signal, said second current control device coupled to said first current control device;
   a linear regulator controller coupled to said first current control device by a first control signal and coupled to said second current control device by a second control signal;
   said first current control device and said second current control device cooperating to produce an output signal in response to said first and second control signals;
   a third current control device coupled to said first current control device;
   a switched mode controller coupled to said first current control device by a third control signal and coupled to said third current control device by a fourth control signal;
   said first current control device and said third current control device cooperating to produce said output signal in response to said third and fourth control signals;
   a converter mode controller controllably coupled to said linear regulator controller and said switched mode controller;
   said converter mode controller causing said power converter to operate in a switched mode in response to a plurality of circuit parameters being set to a first state, to operate in a linear regulation mode in response to one or more transition triggers, and to operate in one or more intermediate modes of operation during a transition between said linear regulation mode and said switched mode, wherein said converter mode controller prevents said output signal from exceeding a predetermined voltage ripple value by maintaining power converter operation in only one of said switched mode or said linear regulator mode in response to steady state input and output conditions.

8. The power converter of claim 7 wherein said first current control device is operable as a switch or a variable resistance device.

9. The power converter of claim 7, wherein said power converter further comprises:
   a feedback signal representing a value of said output signal; and
   a resistive element placed between said first control signal and said first current control device, said resistive element acting in combination with a parasitic input shunt capacitance of said first current control device to create a first dominant pole in a first control loop including said first current control device, said first dominant pole causing said first control loop to respond only to low frequency components of said feedback signal;
   wherein said second current control device is disposed within a second control loop having a second dominant pole, said second dominant pole allowing said second control loop to respond to both low and high frequency components of said feedback signal;
   said first and second dominant poles selected to ensure that a loop response of the combined circuit including said control loops is dominated by the response of said second control loop at a resonant frequency of a filter circuit, said filter circuit including an inductive element connected between an output of said first current control device and an output of said second current control device, and a charge storage capacitor connected at said output signal.

10. The power converter of claim 9 wherein said first current control device has a device parasitic capacitance that increases linearly with a surface area of said first current control device, and wherein said parasitic input shunt capacitance includes said device parasitic capacitance contributed by said first current control device.

11. A method of transitioning a power converter between a switched mode of operation and a linear regulator mode of operation, comprising the steps of:

operating the power converter in a linear regulator operating mode, said linear regulator operating mode using a first current control device and a second current control device, wherein said first current control device and said second current control device cooperate to produce an output signal;

operating the power converter in a switched mode operating mode, said switched mode operating mode using said first current control device and a third current control device, wherein said first current control device and said third current control device cooperate to produce said output signal; and varying a resistance across said first current control device and said second current control device such that power converter operation is maintained in only one of said switched mode operating mode and said linear regulator operating mode in response to steady state input and output conditions.

12. A method of transitioning a power converter between a switched mode of operation and a linear regulator mode of operation, comprising the steps of:

operating the power converter in a switched mode operating mode using a switched mode control loop, said switched mode control loop acting to produce an output signal regulated to a desired switched mode output value;

operating the power converter in a linear regulator operating mode using a linear regulator control loop, said linear regulator control loop acting to produce said output signal regulated to a linear regulator output value, said switched mode output value being greater than said linear regulator output value; and operating the power converter in a transitional operating mode in which both of said switched mode control loop and said linear regulator control loop cooperate to produce said output signal when said output signal is less than either of said switched mode or linear regulator output values.

13. The method of claim 12, wherein said linear regulator control loop decreases a linear regulator current through a current control device when said output signal reaches said linear regulator value, and continues to decrease said linear regulator current in proportion to an increasing difference between said output signal and said linear regulator value until said linear regulator current ceases.

* * * * *